United States Patent Office 2,715,621
Patented Aug. 16, 1955

2,715,621
STEROIDS

John A. Hogg, Kalamazoo Township, Philip F. Beal, Portage Township, and Frank H. Lincoln, Jr., Kalamazoo Township, Kalamazoo County, Mich., assignors to The Upjohn Company, Kalamazoo, Mich., a corporation of Michigan No Drawing. Application March 30, 1953,
Serial No. 345,677

13 Claims. (Cl. 260—239.55)

This invention relates to a novel class of steroids, more particularly to certain 3-cyclic ketalized 11,21-dihydroxy-4,17(20)-pregnadiene-3-ones, and to a process for their production. This application is a continuation-in-part of copending application S. N. 307,385, filed August 30, 1952.

It is an object of the present invention to provide novel 3-cyclic ketalized 11,21-dihydroxy-4,17(20)-pregnadiene-3-ones. Another object of the present invention is the provision of a process for the production thereof. Still another object is the provision of a process for the production and use thereof. Other objects will be apparent to those skilled in the art to which this invention pertains.

The compounds of the present invention may be prepared and used in the production of steroids useful as precursors to cortical hormones according to a series of reactions which may be represented as follows:

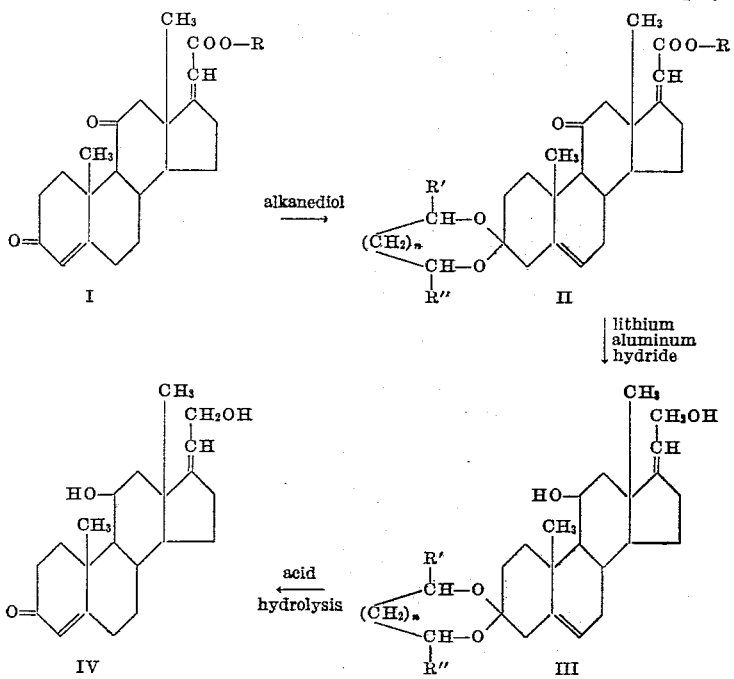

3,11-dione (II) which is then reacted with lithium aluminum hydride, in the presence of an organic solvent, followed by mild hydrolysis of any excess lithium aluminum hydride or organo-lithium complexes to produce a 3-cyclic ketalized 11,21-dihydroxy-4,17(20)-pregnadiene - 3 - one (III) of the present invention. Subjecting said latter compound to an aqueous acid hydrolysis is productive of 11,21-dihydroxy-4,17(20)-pregnadiene-3-one (IV) which can be converted to cortisone or 17-hydroxycorticosterone or their esters according to methods illustrated in greater detail in copending application S. N. 307,385, filed August 30, 1952.

The compounds represented by Formula I may be named as 11-oxygenated-21-carbonyloxy-4,17(20)-pregnadiene-3-ones or as 3-keto-11-oxygenated-4,17(20)-pregnadiene-21-oic acids and 21-alkyl esters thereof. Similarly, the compounds represented by Formula II may be named as 3-cyclic ketalized 11-oxygenated-21-carbonyloxy-4,17(20)-pregnadiene-3-ones or as 3-cyclic ketalized 3-keto-11-oxygenated-4,17(20)-pregnadiene-21-oic acids and 21-alkyl esters thereof.

An 11,21-dihydroxy-4,17(20)-pregnadiene-3-one represented by Formula IV, or a 21-ester thereof, wherein the 11-hydroxy group has the beta stereoconfiguration, is converted to 11β,17α,21-trihydroxy - 4 - pregnene-3,20-dione (Kendall's Compound F) by reaction with osmium tetroxide to produce the 11β,17α,20,21-tetrahydroxy-4-pregnene-3-one 17,20-osmate ester, or 21-ester thereof, and subsequent oxidation thereof, as with perchloric acid, salts thereof, or other equivalent oxidizing agent such as, for example, hydrogen peroxide, dialkyl peroxides, organic peracids such as peracetic acid or perbenzoic acid, potassium chlorate, or the like, in a solvent such as an ether or an alcohol, e. g., tertiary butyl alcohol or diethyl ether, according to procedure already known in the art [Prins and Reichstein, Helv. Chim. Acta, 25, 300 (1942); Ruzicka and Mueller, Helv. Chim. Acta, 22, 755 (1939)].

Similarly, starting with 11α,21-dihydroxy-4,17(20)-pregnadiene-3-one (IV) and proceeding through the same reactions described above, and additionally, preferentially oxidizing the 11-hydroxy group to an 11-keto group, e. g., by esterifying the 21-hydroxy group of the 11α,17α,21-trihydroxy-4-pregnene-3,20-dione, obtained in the osmium wherein R, R' and R" are hydrogens or alkyl radicals preferably containing from one to eight carbon atoms, inclusive, i. e., lower-alkyl, n is the whole number zero or one, and the 11-hydroxy group as represented above has the alpha or beta configuration. The novel compounds of the present invention may be represented by Formula III above.

According to the method of the present invention, a 21-carbonyloxy-4,17(20)-pregnadiene-3,11-dione (I) is contacted with an alkane-α-diol or an alkane-β-diol, i. e., a glycol, in the presence of an acid catalyst, to produce a 3-cyclic ketalized 21-carbonyloxy-4,17(20)-pregnadienetetroxide hydroxylation and subsequent oxidation reaction, then oxidizing the 11α-hydroxy group to an 11-keto group with chromic acid, produces 17α,21-dihydroxy-4-pregnene-3,11,20-trione (Kendall's Compound E).

The starting 21-carbonyloxy-4,17(20)-pregnadiene-3,-11-diones (I) are prepared by contacting an 11-keto-21,21-dihalo-21-carbonylprogesterone represented by the following formula:

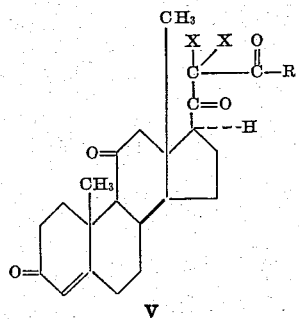

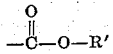

wherein X is a halogen having an atomic weight from 36 to 127, inclusive, i. e., chlorine, bromine or iodine, wherein R is hydrogen or a radical having the formula $$-\overset{O}{\underset{\|}{C}}-O-R'$$

R' being a hydrocarbon radical, with a base, e. g., an alkali-metal alkoxide, in the presence of hydroxy or alkoxy ions to produce a starting 21-carbonyloxy-4,17(20)-pregnadiene-3,11-dione (I) according to the method illustrated in the preparations hereinafter and as more fully disclosed in the above-cited copending application.

In carrying out the process of the present invention, a starting steroid (I) described above, is contacted with an alkane-α-diol or an alkane-β-diol, in the presence of an acid catalyst, to produce a 3-cyclic ketalized 21-carbonyloxy-4,17(20)-pregnadiene-3,11-dione (II) which is then reacted with a reducing agent capable of converting the 11-keto group to a hydroxy group and a 21-carbonyloxy group to a hydroxy group, e. g., lithium aluminum hydride, or the like, in a solvent such as, for example, ether, tetrahydrofuran, or the like, to produce a novel 3-cyclic ketalized 11,21-dihydroxy-4,17(20)-pregnadiene-3-one of the present invention.

The ketalization reaction is usually carried out at a temperature from about room temperature to the boiling point of the reaction solvent employed, for from about one-half hour to about eighteen hours or longer. If the water of the reaction is concomitantly removed, the preferred reaction period is the time required to remove about a molar equivalent of water per mole of steroid from the reaction mixture. Under these conditions, when the starting steroid is a free acid, the acid group may, to a certain extent, be esterified by the alkanediol to produce a glycol ester thereof. Treatment of the reaction mixture with aqueous or alcoholic base, preferably an alkali-metal base, and then liberating the free acid from the thus-produced salt, taking care to avoid hydrolysis of the ketal radical, is productive of essentially pure product (II) wherein R in the 21 position is H, i. e., a free acid.

Alkane-α-diols and alkane-β-diols which may be used include ethylene glycol, trimethylene glycol, and alkyl substituted ethylene glycols and trimethylene glycols, preferably having no more than two alkyl groups substituted thereon, e. g., propane-1,2-diol, butane-1,2-diol, 3-methylbutane-1,2-diol, octane-1,2-diol, butane-2,3-diol, pentane-2,3-diol, 5,5-dimethyloctane-2,3-diol, butane-1,3-diol, pentane-2,4-diol, 4-methylpentane-1,3-diol, octane-1,3-diol, and the like, producing ketalized compounds represented by Formula II wherein n is zero or one.

Acid catalysts which may suitably be employed in the reaction include anhydrous hydrogen chloride, concentrated sulfuric acid, para-toluenesulfonic acid, benzenesulfonic acid, sulfoacetic acid, and the like, in amounts of at least a trace.

Reaction solvents which may be suitably employed include hydrocarbon solvents, halogenated hydrocarbons, ethers, esters, and the like, such as, for example, benzene, toluene, xylene, hexane, heptane, chloroform, carbon tetrachloride, chlorobenzene, diethyl ether, dioxane, tetrahydrofuran, and others, or an excess of the alkanediol employed.

A suitable method of carrying out the above-described reaction comprises dissolving the starting steroid in the selected solvent, preferably a water-immiscible solvent, e. g., benzene, toluene, carbon tetrachloride, and thereafter heating the reaction mixture at the reflux temperature thereof, with the concomitant removal of the water formed in the reaction, until about a molar equivalent of water per mole of steroid has been removed from the mixture. Reaction times from about one-half hour to several days may sometimes be required to complete the ketalization to a satisfactory extent.

Isolation of the resulting ketalized steroid (II) is conveniently achieved by washing the reaction mixture with dilute base, e. g., dilute aqueous sodium bicarbonate, sodium carbonate, potassium hydroxide, methanolic sodium hydroxide, sodium methoxide or the like, and then distilling the mixture to dryness. When the reaction solvent is substantially water-soluble, the base wash may be performed after the solvent has been removed, or the distillation may be substituted by precipitation of the steroid from the mixture by the addition of a large volume of water, preferably containing enough base to neutralize the catalyst.

The next step of the process, i. e., the treatment of the thus-produced 3-cyclic ketalized 21-carbonyloxy-4,17-(20)-pregnadiene-3,11-dione (II) with a reducing agent such as lithium aluminum hydride or the like, is productive of a 3-cyclic ketalized 11,21-dihydroxy-4,17(20)-pregnadiene-3-one (III) of the present invention wherein the 11-hydroxy group has the alpha or beta configuration.

The lithium aluminum hydride reduction is usually carried out by adding a solution of the selected 3-cyclic ketalized 21-carbonyloxy-4,17(20)-pregnadiene-3,11-dione, in an organic solvent which is non-reactive under the conditions of the reaction, to lithium aluminum hydride solution or suspension in ether. Other solvents which may be used include dioxane, tetrahydrofuran, or the like, as well as other solvents commonly used in lithium aluminum hydride reductions. When ether is used, the reaction is usually carried out at a temperature between about room temperature and the boiling point of the solvent, although temperatures substantially below room temperature may sometimes be successfully employed.

Lithium aluminum hydride is usually employed in a substantial chemical equivalent excess to ensure optimum yields of desired product. When the steroid and lithium aluminum hydride have been thoroughly mixed and the heat of reaction has subsided, the reaction is essentially complete. Continued stirring or heating or both are usually employed, however, to ensure completeness of reaction. The excess lithium aluminum hydride and any steroid-LiAlH4 complex is decomposed by the careful addition of water to the reaction mixture. If the reaction mixture is maintained at an alkaline pH, that is, if no mineral acid or the like is added during the decomposition of the lithium aluminum hydride or subsequent thereto, the corresponding 3-cyclic ketalized 11,21-dihydroxy-4,17(20)-pregnadiene-3-one can be isolated directly from the reaction mixture. Separating the organic phase from the aqueous phase of the decomposed reaction mixture and then distilling the solvent therefrom leaves a distillation residue consisting essentially of the desired product. The resulting 3-cyclic ketalized 11,21- dihydroxy-4,17(20)-pregnadiene-3-one (III) of the present invention may be isolated as described above, for example, or further reacted without isolation as more fully disclosed hereinafter.

The free 3-ketone, an 11,21-dihydroxy-4,17(20)-pregnadiene-3-one (IV), may be prepared by treatment of a solution of the crude or purified 3-cyclic ketalized 11,21-dihydroxy-4,17(20)-pregnadiene-3-one in an organic solvent with dilute aqueous acid, preferably a mineral acid such as, for example, hydrochloric or sulfuric acid, usually at about room temperature, for from about one-half hour to about 72 hours. The amount of the acid employed is usually from about a trace to a large molar excess and concentrations from extremely dilute to fairly concentrated may be employed since the acid acts only as a catalyst for the hydrolysis. When the hydrolysis product is 11α,21-dihydroxy-4,17(20)-pregnadiene-3-one, the hydrolysis of the 3-cyclic ketal can be carried out under fairly rigorous conditions, i. e., with a fairly strong concentration of acid and at temperatures substantially above room temperature, whereas when the hydrolysis product is 11β,21-dihydroxy-4,17(20)-pregnadiene-3-one, the hydrolysis reaction is preferably carried out at about room temperature and in the presence of more dilute acid since the 11β-hydroxy group has a tendency to dehydrate in the presence of acid. The reaction temperature and reaction time required to complete the hydrolysis reaction is somewhat dependent upon the particular 3-ketal group present in the steroid. Isolation of the free 11,21-dihydroxy - 4,17(20) - pregnadiene - 3 - one is conveniently achieved by neutralizing the reaction mixture, distilling the solvent therefrom, or adding a large volume of water thereto if the solvent is water-miscible, and then removing the thus-precipitated product. The thus-isolated 11,21-dihydroxy-4,17(20)-pregnadiene-3-one (IV), after drying, usually does not require purification for subsequent reactions if the starting 3-cyclic ketal was pure.

A convenient procedure for obtaining an 11,21-dihydroxy-4,17(20)-pregnadiene-3-one (IV) from a 3,11-diketo-4,17(20)-pregnadiene-21-oic acid and alkyl ester thereof (I) involves reacting the starting 3,11-diketo-4,17(20)-pregnadiene-21-oic acid or alkyl ester thereof, protected at the 3 position with a 3-ketal, preferably a 3-ethylene glycol ketal (II, R' and R''=H, $n=1$, with a reducing agent, e. g., lithium aluminum hydride, and then, after decomposing the intermediate complex with water, removing the 3-ketal of the reaction product without isolation.

A preferred procedure comprises the reaction of the starting 3-ketalized 3,11-diketo-4,17(20)-pregnadiene-21-oic acid or alkyl ester thereof (II) with lithium aluminum hydride in a water-miscible, non-reactive solvent, e. g., tetrahydrofuran or dioxane, at a temperature substantially below room temperature, i. e., at least below twenty degrees centigrade, and then decomposing the intermediate complex thus-formed with water. A low reaction temperature ensures a minimum of side reactions and the use of a water-miscible solvent ensures complete contact of the water with the reaction complex and avoids a two-phase solvent system. Water is preferred to decompose the reaction complex since the steroids are more stable in neutral solution and the decomposition reaction is not accompanied by the heat of reaction of lithium and aluminum hydroxides with acid. The 3-ketal function may then be removed by hydrolysis, e. g., with hydrochloric acid or the like, without changing solvents since the water-miscible solvent employed in the reduction is an excellent solvent for the ketal hydrolysis.

The process of the present invention provides a method of converting a steroid having a Δ⁴-3-keto group and a 21-carbonyloxy group into a steroid in which the 21-carbonyloxy group has been reduced to a 21-hydroxy group whereas the Δ⁴-3-keto group has been unaffected. Heretofore, the methods known in the art would have reduced only the keto group or would have reduced both the keto group and the carbonyloxy group, probably with the concomitant saturation of the double bonds in the steroid.

The following examples are illustrative of the process and products of the present invention but are not to be construed as limiting.

PREPARATION 1.—SODIUM ENOLATE OF 11-KETO-21-ETHOXYOXALYLPROGESTERONE

To a mixture of 3.4 milliliters of a 3,4 normal methanolic sodium methoxide solution, 0.45 milliliter of absolute ethanol, and twenty milliliters of dry benzene, said mixture previously having been distilled until eight milliliters of distillate had been collected and then cooled, was added 2.3 milliliters of ethyl oxalate and a solution of 3.28 grams of 11-ketoprogesterone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 11 - keto - 21 - ethoxyoxalylprogesterone was filtered, washed with several fifty-milliliter portions of ether, and after drying found to weigh 3.65 grams. The ether wash contained 0.54 gram of unreacted 11-ketoprogesterone. The yield of the sodium enolate of 11-keto-21-ethoxyoxalylprogesterone was 81 percent of the theoretical or practically quantitative calculated on the reacted 11-ketoprogesterone.

Acidification of an aqueous solution of the thus-produced sodium enolate of 11-keto-21-ethoxyoxalylprogesterone is productive of 11-keto-21-ethoxyoxalylprogesterone which may be removed therefrom by filtration.

PREPARATION 2.—11-KETO-21,21-DIBROMO-21-ETHOXYOXALYLPROGESTERONE

To a stirred solution of 4.50 grams (0.01 mole) of the sodium enolate of 11-keto-21-ethoxyoxalylprogesterone and two grams of potassium acetate in seventy milliliters of glacial acetic acid was added 3.09 grams (1.00 milliliter; 0.0193 mole) of bromine dropwise at room temperature. When the addition was complete, the reaction mixture was mixed with a large volume of water. The aqueous layer was then decanted from the precipitated viscous yellow product which was thereafter dissolved in alcohol and reprecipitated as a white solid by the dropwise addition of water. The yield of thus-produced 11-keto-21,21-dibromo-21-ethoxyoxalylprogesterone, after filtering and drying, was 4.0 grams, a yield of seventy percent of the theoretical.

PREPARATION 3.—3,11-DIKETO-4,17(20)-PREGNADIENE-21-OIC ACID METHYL ESTER

To a solution of 5.90 grams (0.01 mole) of 11-keto-21,21 - dibromo - 21-ethoxyoxalylprogesterone, obtained according to the method given in Preparation 2, in 150 milliliters of methanol, was added 3.24 grams (0.06 mole) of commercial grade sodium methoxide. The resulting admixture was maintained for three hours at about 25 degrees centigrade, whereafter the whole was diluted with water and then extracted with two portions of methylene chloride. The methylene chloride extracts were dried with anhydrous sodium sulfate and the solvent was thereafter distilled at atmospheric pressure, leaving a quantitative yield of 3.60 grams of 3,11-diketo-4,17(20-pregnadiene-21-oic acid methyl ester as an oil. This oil was dissolved in fifty milliliters of benzene and chromatographed over a column of 170 grams of Florisil synthetic magnesium silicate. The column was developed with 400-milliliter portions of solvent of the following composition and order: three portions of methylene chloride, five portions of methylene chloride plus five percent acetone, and one portion of acetone. The methylene chloride plus five percent acetone eluates were combined and the solvent was removed therefrom leaving 1.5 grams of crystalline 3,11-diketo-4,17(20)-pregnadiene-21-oic acid methyl ester which, after crystallization from acetone and Skellysolve B hexane hydrocarbons, melted at 213 to 214 degrees centigrade.

Analysis:
Calculated for $C_{22}H_{28}O_4$: C, 74.17; H, 7.92
Found: C, 74.37; H, 8.21.

PREPARATION 4.—3,11-DIKETO-4,17(20)-PREGNADIENE-21-OIC ACID ETHYL ESTER

In the same manner as described in Preparation 3, 3,11-diketo-4,17(20)-pregnadiene-21-oic acid ethyl ester is prepared by replacing the sodium methoxide in methanol used in the above described example with sodium ethoxide in ethanol.

Similarly, other 3,11-diketo-4,17(20)-pregnadiene-21-oic acid esters are prepared wherein the ester is lower-alkyl, e. g., propyl, butyl, amyl, hexyl, heptyl, octyl, or the like, by replacing the sodium methoxide in methanol used in the above-described reaction with the selected alkali-metal alkoxide in an alkanol.

PREPARATION 5.—3,11-DIKETO-4,17(20)-PREGNADIENE-21-OIC ACID

In exactly the same manner as given in Preparation 3, 3,11-diketo-4,17(20)-pregnadiene-21-oic acid was prepared from the sodium enolate of 11-keto-21-ethoxyoxalylprogesterone by substituting 3.4 grams (0.06 mole) of potassium hydroxide in ten milliliters of water for the sodium methoxide used in the above-described reaction, thus producing the potassium salt of the desired acid. The 3,11-diketo-4,17(20)-pregnadiene,21-oic acid was isolated by washing the reaction mixture with methylene chloride, acidifying with dilute hydrochloric acid and extracting the thus-produced oily precipitate with benzene. The benzene extract was washed with water, dried, and thereafter distilled at reduced pressure to remove the benzene. The residual 3,11-diketo-4,17(20)-pregnadiene-21-oic acid, after several crystallizations, melted at 255 to 260 degrees centigrade.

*Example 1.—3-ethylene glycol ketal of 3,11-diketo-4,17-(20)-pregnadiene-21-oic acid methyl ester*

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

Analysis:
Calculated for $C_{24}H_{32}O_5$: C, 71.94; H, 8.05.
Found: C, 71.90; H, 7.95.

Similarly, the 3-ethylene glycol ketals of other alkyl esters of 3,11-diketo-4,17(20)-pregnadiene-21-oic acid such as, for example, the methyl ester, the ethyl, propyl, butyl, amyl, hexyl, heptyl, octyl, or like ester, preferably the methyl esters, are prepared by reacting the selected alkyl ester of 3,11-diketo-4,17(20)-pregnadiene-21-oic acid with ethylene glycol according to the method described in Example 1 in the presence of an acid catalyst such as, for example, anhydrous hydrogen chloride, benzenesulfonic acid, paratoluenesulfonic acid, or the like.

*Example 2.—3-ethylene glycol ketal of 3,11-diketo-4,17(20)-pregnadiene-21-oic acid methyl ester*

In exactly the same manner as described in Example 1, 0.750 gram (0.0021 mole) of 3,11-diketo-4,17(20)-pregnadiene-21-oic acid methyl ester was reacted for seven hours with four milliliters of ethylene glycol in 100 milliliters of benzene in the presence of 0.075 gram of para-toluenesulfonic acid with concomitant removal of the water of reaction. The cooled mixture was washed with cold two percent sodium bicarbonate solution and water, extracting the washes with benzene which was added to the benzene layer. The combined benzene solutions were dried over sodium sulfate and then poured over a 75-gram column of Florisil synthetic magnesium silicate. The column was developed with Skellysolve B hexane hydrocarbons plus five percent acetone. The eluates were collected in 100-milliliter fractions, of which fractions five, six, and seven contained 261, 408, and 118 milligrams of crystalline solids, respectively (a combined yield of 93.5 percent of the theoretical). The combined solids were crystallized from a mixture of 25 milliliters of Skellysolve B and eight milliliters of ethyl acetate containing two drops of pyridine. The first crop of crystalline 3-ethylene glycol ketal of 3,11-diketo-4,17(20)-pregnadiene 21-oic acid methyl ester weighed 0.580 gram, melted at 177 to 179 degrees centigrade, and had and $[\alpha]_D^{23}$ in acetone to plus nine degrees, and the second crop weighed 0.100 gram and melted at 165 to 177 degrees centigrade.

*Example 3.—3-trimethylene glycol ketal of 3,11-diketo-4,17(20)-pregnadiene-21-oic acid methyl ester*

In the same manner as described in Example 1, reacting 3,11-diketo-4,17(20)-pregnadiene-21-oic acid methyl ester with trimethylene glycol in the presence of an acid catalyst is productive of the 3-trimethylene glycol ketal of 3,11-diketo-4,17(20)-pregnadiene-21-oic acid methyl ester.

Similarly, other 3-ketals of this and other esters of 3,11-diketo-4,17(20)-pregnadiene-21-oic acid are produced by the reaction of the selected ester of the above-described steroid acid, especially the methyl, ethyl, propyl, butyl, amyl, hexyl, heptyl, or octyl ester, with a glycol such as, for example, ethylene glycol, propylene glycol, trimethylene glycol, alkyl substituted ethylene glycol, propylene glycol, or trimethylene glycol, or the like, in the presence of an acid catalyst, such as, for example, para-toluenesulfonic acid, hydrogen chloride, sulfuric acid, or the like.

*Example 4.—3-ethylene glycol ketal of 11β,21-dihydroxy-4,17(20)-pregnadiene-3-one*

Eighty milliliters of the supernatant liquid from a solution of one gram of lithium aluminum hydride in 100 milliliters of anhydrous ether was cooled in a flask in an ice-salt bath and one gram of the 3-ethylene glycol ketal of 3,11-diketo-4,17(20)-pregnadiene-21-oic acid methyl ester in fifty milliliters of anhydrous benzene was then added with stirring thereto over a period of ten minutes. The reaction mixture was then decomposed with a saturated aqueous sodium potassium tartrate solution which was cautiously added to the reaction mixture. The solvent layer was then decanted from the resulting mixture and the aqueous layer washed with two fifty-milliliter portions of benzene which was then added to the solvent layer. The combined solvent solutions were dried over anhydrous sodium sulfate and then poured over a 75-gram column of Florisil synthetic magnesium silicate. The column was developed with 250-milliliter portions of solvents of the following composition and order: four portions of Skellysolve B plus ten percent acetone, six portions of Skellysolve B plus fifteen percent acetone, and finally several portions of Skellysolve B plus 25 percent acetone. The first two Skellysolve B plus ten percent acetone eluates were combined, the solvent distilled therefrom and the 488 milligrams of solids contained therein were crystallized from acetone plus Skellysolve B to yield the 3-ethylene glycol ketal of 11β,21-dihydroxy-4,17(20)-pregnadiene-3-one melting at 183 to 187 degrees centigrade and having an $[\alpha]_D^{23}$ of minus fifteen degrees in acetone.

Analysis:
Calculated for $C_{23}H_{34}O_4$: C, 73.76; H, 9.15.
Found: C, 73.87; H, 9.22.

*Example 5.—3-ethylene glycol ketal of 11α,21-dihydroxy-4,17(20)-pregnadiene-3-one*

The first Skellysolve B plus 25 percent acetone eluate of the chromatographic separation described in Example 4 contained 142 milligrams of the 3-ethylene glycol ketal of 11α,21-dihydroxy-4,17(20)-pregnadiene-3-one which, after a crystallization from a mixture of acetone and Skellysolve B, melted at 206 to 214 degrees centigrade.

Similarly, the 3-ethylene glycol ketals of 11α,21- and 11β,21-dihydroxy-4,17(20)-pregnadiene-3-one are prepared by the reaction of lithium aluminum hydride in ether with the 3-ethylene glycol ketal of 3,11-diketo-4,17(20)-pregnadiene-21-oic acid or an alkyl ester thereof, e. g., the methyl, ethyl, propyl, butyl, isobutyl, amyl, hexyl, heptyl, or octyl ester, or the like.

*Example 6.—3-trimethylene glycol ketal of 11α,21- and 11β,21-dihydroxy-4,17(20)-pregnadiene-3-one*

Reacting the 3-trimethylene glycol ketal of 3,11-diketo-4,17(20)-pregnadiene-21-oic acid methyl ester with lithium aluminum hydride in tetrahydrofuran is productive of the 3-trimethylene glycol ketals of 11α,21- and 11β,21-dihydroxy-4,17(20)-pregnadiene-3-one, which can also be prepared by the reaction of other alkyl esters of the 3-trimethylene glycol ketal of 3,11-diketo-4,17(20)-pregnadiene-21-oic acid.

Other 3-cyclic ketals of 11,21-dihydroxy-4,17(20)-pregnadiene-3-one wherein the 11-hydroxy group has the alpha or beta configuration are prepared by the reaction of the selected 3-cyclic ketal of 3,11-diketo-4,17(20)-pregnadiene-21-oic acid or alkyl ester thereof with an alkali-metal aluminum hydride, or the like, wherein the 3-cyclic ketal group of the thus-produced 3-cyclic ketal of 11,21-dihydroxy-4,17(20)-pregnadiene-3-one and the reduced product are the same. 3-cyclic ketals which may be present on the starting and resulting compounds include the ethylene glycol ketal, propylene glycol ketal, trimethylene glycol ketal, butane-1,2-diol ketal, hexane-3,4-diol ketal, and the like.

*Example 7.—11α,21-dihydroxy-4,17(20)-pregnadiene-3-one*

To a solution of 2.4 grams (0.0642 mole) of the 3-ethylene glycol ketal of 11α,21-dihydroxy-4,17(20)-pregnadiene-3-one in 160 milliliters of acetone was added four drops of concentrated sulfuric acid in forty milliliters of water and the mixture was then refluxed for two hours. The cooled solution was rendered neutral by the addition of a dilute aqueous solution of sodium bicarbonate and the acetone was then removed therefrom by distillation at reduced pressure. The precipitated product was extracted with methylene chloride which was subsequently dried over anhydrous sodium sulfate after separation from the aqueous layer. The dried methylene chloride solution was distilled to dryness at reduced pressure to leave 1.96 grams, a yield of 93 percent of the theoretical, of product consisting essentially of 11α,21-dihydroxy-4,17(20)-pregnadiene-3-one.

*Example 8.—11β,21-dihydroxy-4,17(20)-pregnadiene-3-one*

A solution of 0.572 gram (0.0015 mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water was then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

One crystallization of this product from a mixture of ethyl acetate and Skellysolve B hexane hydrocarbons gave crystals of 11β,21-dihydroxy-4,17(20)-pregnadiene-3-one melting at 156 to 158 degrees centigrade and having an $[\alpha]_D^{23}$ of plus 128 degrees in acetone.

Analysis:
Calculated for $C_{21}H_{30}O_3$: C, 76.32; H, 9.15
Found: C, 76.04; H, 9.43
C, 75.83; H, 9.40

In the same manner as described in Example 7, 11β,21-dihydroxy-4,17(20)-pregnadiene-3-one and 11α,21-dihydroxy-4,17(20)-pregnadiene-3-one are prepared by contacting other 3-ketals of 11β,21-dihydroxy-4,17(20)-pregnadiene-3-one and 11α,21-dihydroxy-4,17(20)-pregnadiene-3-one, respectively, with a hydrolyzing agent such as, for example, dilute hydrochloric acid, sulfuric acid, or the like.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. In a process for the production of a 3-cyclic ketalized 11,21-dihydroxy-4,17(20)-pregnadiene-3-one which comprises the steps of: first, contacting a 3,11-diketo-4,17(20)-pregnadiene-21-carbonyloxy steroid represented by the following formula:

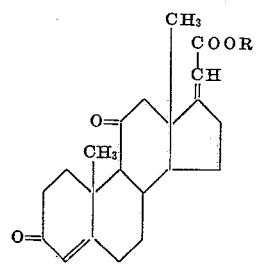

wherein R is selected from the group consisting of hydrogen and alkyl radicals, with an organic ketal forming agent selected from the group consisting of alkane-α-diols and alkane-β-diols containing less than nine carbon atoms, in the presence of an acid catalyst, to produce a 3-cyclic ketalized 3,11-diketo-4,17(20)-pregnadiene-21- carbonyloxy steroid and then reacting the thus-produced 3-cyclic ketalized steroid with lithium aluminum hydride in the presence of an organic solvent followed by the hydrolysis with water of any organo-lithium complexes and excess lithium aluminum hydride present, to produce a 3-cyclic ketalized 11,21-dihydroxy-4,17(20)-pregnadiene-3-one.

2. In a process for the production of a 3-cyclic ketalized 11,21-dihydroxy-4,17(20)-pregnadiene-3-one which comprises the steps of: first, contacting a 3,11-diketo-4,17(20)-pregnadiene-21-oic acid alkyl ester with an alkane-α-diol containing less than nine carbon atoms organic ketal forming agent, in the presence of an acid catalyst, to produce a 3-cyclic ketalized 3,11-diketo-4,17(20)-pregnadiene-21-oic acid alkyl ester and then reacting the thus-produced 3-cyclic ketalized steroid with lithium aluminum hydride in the presence of an organic solvent followed by the hydrolysis with water of any organo-lithium complexes and excess lithium aluminum hydride present, to produce a 3-cyclic ketalized 11,21-dihydroxy-4,17(20)-pregnadiene-3-one.

3. In a process for the production of the 3-ethylene glycol ketal of 11,21-dihydroxy-4,17(20)-pregnadiene-3-one which comprises the steps of: first, contacting a 3,11-diketo-4,17(20)-pregnadiene-21-oic acid alkyl ester with ethylene glycol, in the presence of an acid catalyst, to produce the 3-ethylene glycol ketal of 3,11-diketo-4,17(20)-pregnadiene-21-oic acid alkyl ester and then reacting the thus-produced 3-ethylene glycol ketal of a 3,11-diketo-4,17(20)-pregnadiene-21-oic acid alkyl ester with lithium aluminum hydride in the presence of an organic solvent followed by the hydrolysis with water of any organo-lithium complexes and excess lithium aluminum hydride to produce the 3-ethylene glycol ketal of 11,21-dihydroxy-4,17(20)-pregnadiene-3-one.

4. In a process for the production of the 3-ethylene glycol ketal of 11β,21-dihydroxy-4,17(20)-pregnadiene-3-one which comprises the steps of: first, contacting 3,11-diketo-4,17(20)-pregnadiene-21-oic acid methyl ester with ethylene glycol, in the presence of an acid catalyst, to produce the 3-ethylene glycol ketal of 3,11-diketo-4,17(20)-pregnadiene-21-oic acid methyl ester and then reacting the thus-produced 3-ethylene glycol ketal of 3,11-diketo-4,17(20)-pregnadiene-21-oic acid methyl ester with lithium aluminum hydride in the presence of an organic solvent followed by the hydrolysis with water of any organo-lithium complexes and excess lithium aluminum hydride present, to produce the 3-ethylene glycol ketal of 11β,21-dihydroxy-4,17(20)-pregnadiene-3-one.

5. A process for the production and use of a 3-cyclic ketalized 11,21-dihydroxy-4,17(20)-pregnadiene-3-one which comprises the steps of: first, contacting a 3,11-diketo-4,17(20)-pregnadiene-21-carbonyloxy steroid represented by the following formula:

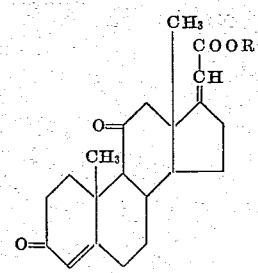

wherein R is selected from the group consisting of hydrogen and alkyl radicals, with an organic ketal forming agent selected from the group consisting of alkane-α-diols and alkane-β-diols containing less than nine carbon atoms in the presence of an acid catalyst, to produce a 3-cyclic ketalized 3,11-diketo-4,17(20)-pregnadiene-21-carbonyloxy steroid and then reducing the thus-produced 3-cyclic ketalized steroid to 3-cyclic ketalized 11,21-dihydroxy-4,17(20)-pregnadiene-3-one with lithium aluminum hydride in the presence of an organic solvent, followed by the acid hydrolysis of the thus-produced 3-cyclic ketalized 11,21-dihydroxy-4,17(20)-pregnadiene-3-one, to produce 11,21-dihydroxy-4,17(20)-pregnadiene-3-one.

6. A process for the production and use of a 3-cyclic ketalized 11,21-dihydroxy-4,17(20)-pregnadiene-3-one which comprises the steps of: first, contacting a 3,11-diketo-4,17(20)-pregnadiene-21-oic acid alkyl ester with an alkane-α-diol containing less than nine carbon atoms organic ketal forming agent, in the presence of an acid catalyst, to produce a 3-cyclic ketalized 3,11-diketo-4,17(20)-pregnadiene-21-oic acid alkyl ester and then reducing the thus-produced 3-cyclic ketalized steroid to 3-cyclic ketalized 11β,21-dihydroxy-4,17(20)-pregnadiene-3-one with lithium aluminum hydride in the presence of an organic solvent, followed by the acid hydrolysis of the thus-produced 3 - cyclic ketalized 11β,21 - dihydroxy - 4,17(20)-pregnadiene-3-one, to produce 11β,21-dihydroxy-4,17(20)-pregnadiene-3-one.

7. A process for the production and use of the 3-ethylene glycol ketal of 11β,21-dihydroxy-4,17(20)-pregnadiene-3-one which comprises the steps of: first, contacting a 3,11-diketo-4,17(20)-pregnadiene-21-oic acid alkyl ester with ethylene glycol, in the presence of an acid catalyst, to produce the 3-ethylene glycol ketal of 3,11-diketo-4,17(20)-pregnadiene-21-oic acid alkyl ester and then reducing the thus-produced 3-ethylene glycol ketal of 3,11-diketo-4,17(20)-pregnadiene-21-oic acid alkyl ester to 3-ethylene glycol ketal of 11β,21-dihydroxy-4,17(20)-pregnadiene-3-one with lithium aluminum hydride in the presence of an organic solvent, followed by the acid hydrolysis of the thus-produced 3-ethylene glycol ketal of 11β,21-dihydroxy-4,17(20)-pregnadiene - 3 - one, to produce 11β,21 - dihydroxy-4,17(20)-pregnadiene-3-one.

8. A process for the production and use of the 3-ethylene glycol ketal of 11β,21-dihydroxy-4,17(20)-pregnadiene-3-one which comprises the steps of: first, contacting 3,11-diketo-4,17(20)-pregnadiene-21-oic acid methyl ester with ethylene glycol, in the presence of an acid catalyst, to produce the 3-ethylene glycol ketal of 3,11-diketo-4,17(20)-pregnadiene-21-oic acid methyl ester and then reducing the thus-produced 3-ethylene glycol ketal of 3,11-diketo-4,17(20)-pregnadiene-21-oic acid alkyl ester to 3-ethylene glycol ketal of 11β,21-dihydroxy-4,17(20)-pregnadiene-3-one with lithium aluminum hydride in the presence of an organic solvent, followed by the acid hydrolysis of the thus-produced 3-ethylene glycol ketal of 11β,21-dihydroxy-4,17(20)-pregnadiene-3-one, to produce 11β,21-dihydroxy-4,17(20)-pregnadiene-3-one.

9. A 3-cyclic ketalized 11,21-dihydroxy-4,17(20)-pregnadiene-3-one represented by the following formula:

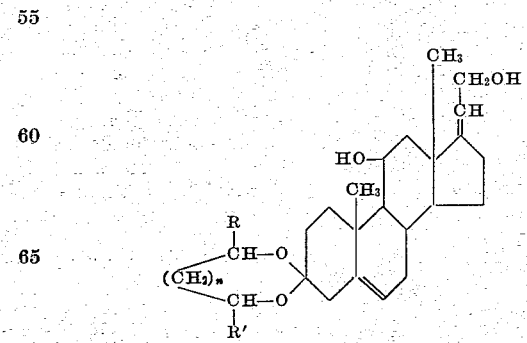

wherein R and R' together contain less than nine carbon atoms and are selected from the group consisting of hydrogen and alkyl radicals containing from one to eight carbon atoms, inclusive, and $n$ is selected from the whole numbers zero and one.

10. A 3-cyclic ketalized 11,21-dihydroxy-4,17(20)-pregnadiene-3-one represented by the following formula:
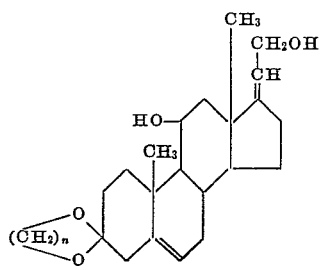
wherein $n$ is a whole number from two to three, inclusive.
11. A compound of claim 10 wherein $n$ is 2.
12. The 3-ethylene glycol ketal of 11β,21-dihydroxy-4,17(20)-pregnadiene-3-one.
13. The 3-ethylene glycol ketal of 11α,21-dihydroxy-4,17(20)-pregnadiene-3-one.
No references cited.